UNITED STATES PATENT OFFICE.

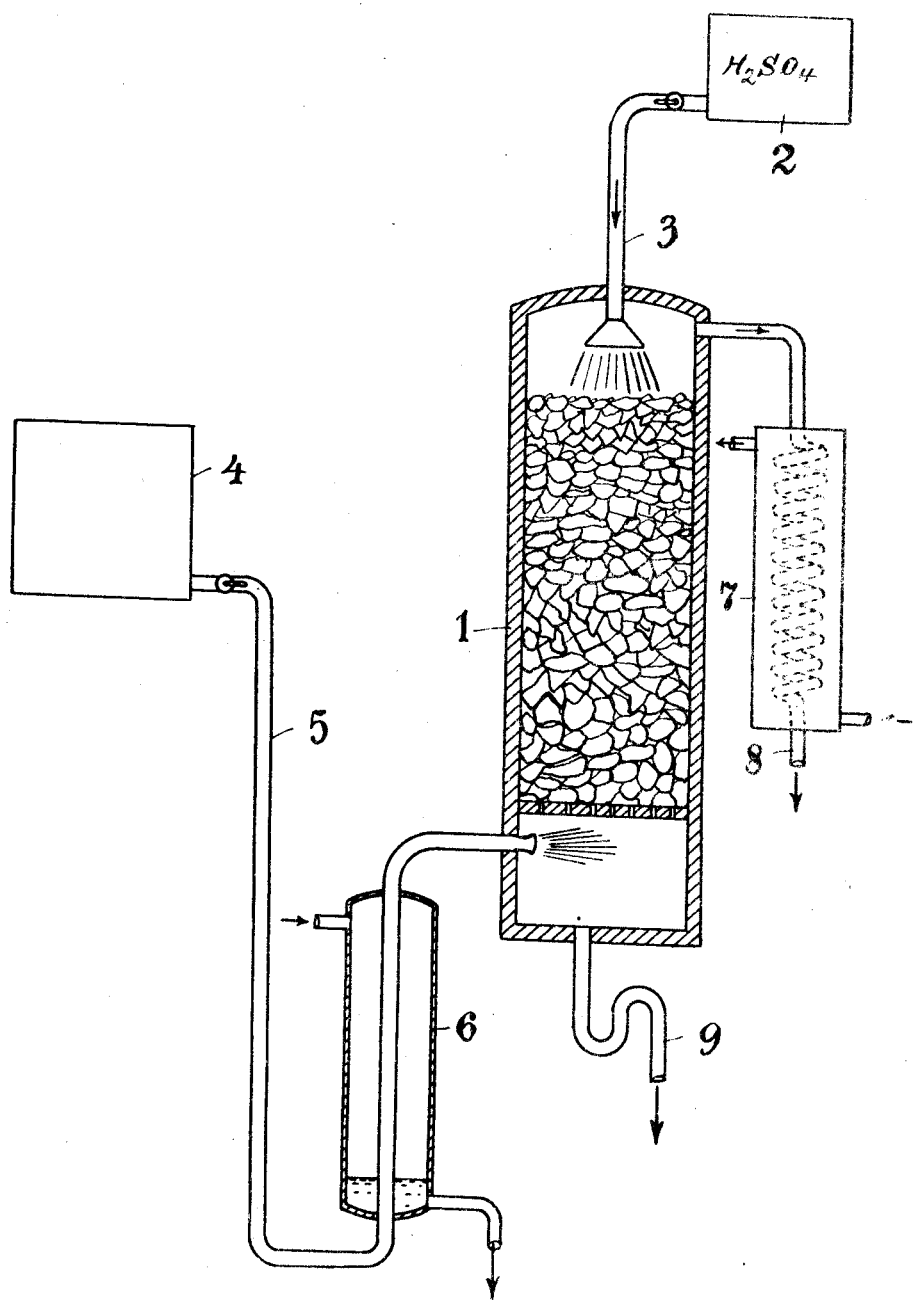

NIKOLAI TITLESTAD, OF RJUKAN, NORWAY, ASSIGNOR TO NORSK HYDRO-ELEKTRISK KVAELSTOFAKTIESELSKAB, OF CHRISTIANIA, NORWAY.

PROCESS OF CONCENTRATING NITRIC ACID.

1,178,888.   Specification of Letters Patent.   Patented Apr. 11, 1916.

Application filed September 8, 1914. Serial No. 860,733.

*To all whom it may concern:*

Be it known that I, NIKOLAI TITLESTAD, a subject of the King of Norway, residing at Rjukan, Norway, have invented certain new and useful Improvements in Processes of Concentrating Nitric Acid; and I do hereby declare the following to be a full, clear, and exact description of the invention, such as will enable others skilled in the art to which it appertains to make and use the same.

This invention has for its object a process of concentrating nitric acid.

In the processes hitherto employed for concentrating nitric acid in counter current with sulfuric acid or other similar concentrating agents one has proceeded in the manner, that nitric acid has been introduced into the concentration apparatus either as a liquid or as a vapor. In the first instance viz. when the nitric acid is introduced as a liquid the apparatus must be directly or indirectly heated to effect the distillation of the concentrated acid. In the latter case that is when introducing the acid as a vapor the apparatus as is known must be cooled either by the arrangement of cooling devices or by introducing a cooling fluid such as for instance described in the Norwegian patent specification No. 23153.

According to the present invention a very rational concentration is obtained by combining the known methods in the manner that the acid to be concentrated is introduced into a concentration apparatus as a mixture of vapor and liquid. This mixture of liquid and vapor is suitably produced by boiling nitric acid outside of the concentration apparatus. By proceeding in this manner important advantages are obtained. As such is to be mentioned that the concentration process could be carried out without further heating because the amount of heat supplied by the mixture together with the reaction heat developed during the concentration process is sufficient to effect the distillation of the concentrated nitric acid. Further the evaporation of the nitric acid which is still in a liquid state effects a reduction and distribution of the temperature in such manner, that the temperature at no point in the apparatus becomes too high, that is so high as to have an injurious influence upon the concentration process. A very important advantage consists in that the control of the working of the apparatus from one point is made possible, it being only necessary to regulate the supply of the mixture of vapor and liquid in order to obtain a uniform working of the concentration process.

It is obvious, that by proceeding in the manner above described important advantages are obtained and that the technical effect is considerably improved in comparison to the processes hitherto employed. Thus it is made possible by this process to concentrate nitric acid in an apparatus of a very simple construction having no heating arrangements for the distillation of the concentrated nitric acid or cooling means for controlling the temperature. As a result of these simplifications of the plant the regulation of the apparatus is greatly facilitated, which also increases the safety of operation. The production is thereby improved in quantity as well as in quality. The concentrating power of the sulfuric acid is utilized to the highest extent and the loss of sulfuric acid is reduced to a minimum.

In the accompanying drawing is illustrated an apparatus for carrying out my invention, partly in elevation and partly in vertical section.

In this drawing, 1 is the concentrating chamber, 2 a vessel containing concentrated sulfuric acid or other equivalent concentrating agent. The concentrating agent is supplied from vessel 2 to the top of the tower or concentrating chamber 1 through a pipe 3. The nitric acid to be concentrated flows from a reservoir 4 through pipe 5 into the bottom of the tower 1. The pipe 5 is surrounded by a steam heating chamber 6. By suitably adjusting the supply of steam to chamber 6 in relation to the supply of dilute nitric acid passing through pipe 5, the nitric acid in this pipe is transformed into the desired mixture of vapor and liquid. The nitric acid vapors escaping from the top of the tower are passed through a condenser 7, from which concentrated acid is withdrawn at 8. The concentrating agent escapes at 9 from the bottom of the tower.

Claims:

1. The process of concentrating nitric acid in counter current with a suitable concentrating agent, which comprises supplying said nitric acid to said concentrating agent as a mixture of liquid and vapor.

2. In the process of concentrating nitric acid in counter current with sulfuric acid the step which consists in introducing the nitric acid into the concentration apparatus as a mixture of liquid and vapor, produced by boiling the nitric acid to be concentrated outside of the concentration apparatus.

In testimony that I claim the foregoing as my invention, I have signed my name in presence of two subscribing witnesses.

NIKOLAI TITLESTAD.

Witnesses:
M. E. GUTTORUSEN.
C. F. HANSEN.